United States Patent [19]

Krambrock

[11] Patent Number: 4,836,250

[45] Date of Patent: Jun. 6, 1989

[54] DEVICE FOR CLOSING A PIPE BRANCH

[75] Inventor: Wolfgang Krambrock, Vogt, Fed. Rep. of Germany

[73] Assignee: AVT Anlagen- und Verfahrenstechnik GmbH, Weingarten, Fed. Rep. of Germany

[21] Appl. No.: 235,935

[22] Filed: Aug. 24, 1988

[30] Foreign Application Priority Data

Sep. 4, 1987 [DE] Fed. Rep. of Germany ....... 3729684
Jan. 15, 1988 [DE] Fed. Rep. of Germany ....... 3800942

[51] Int. Cl.$^4$ ............................................. F16K 11/076
[52] U.S. Cl. .................................. 137/625.47; 137/876; 193/31 R; 251/161; 251/175; 406/183
[58] Field of Search ........................... 137/625.47, 876; 193/31 R, 31 A; 251/160, 161, 175; 406/183

[56] References Cited

U.S. PATENT DOCUMENTS

| 3,199,537 | 8/1965 | Swanson ................... 137/625.47 X |
| 3,545,489 | 12/1970 | Brown et al. ........................ 137/876 |
| 3,658,093 | 4/1972 | Kirkwood ....................... 251/175 X |
| 3,837,616 | 9/1974 | Castriota-Scanderberg ... 251/175 X |
| 4,049,105 | 9/1977 | Kinbersley ....................... 137/874 X |
| 4,055,280 | 10/1977 | Kohl et al. .................. 137/625.46 X |
| 4,063,572 | 12/1977 | Anderegg et al. ............. 251/161 X |
| 4,252,479 | 2/1981 | Scherfenberg . |
| 4,506,697 | 3/1985 | Marchant .................... 137/625.46 X |

FOREIGN PATENT DOCUMENTS

| 277519 | 8/1914 | Fed. Rep. of Germany ........................ 137/625.47 |
| 1977787 | 1/1968 | Fed. Rep. of Germany . |
| 2148557 | 5/1973 | Fed. Rep. of Germany . |

OTHER PUBLICATIONS

"Rohrweichen als Leitungselemente...", Maschinenmarkt Würzburg, 8, 1978, 65, S. 1274.

Primary Examiner—Gerald A. Michalsky
Attorney, Agent, or Firm—Spencer & Frank

[57] ABSTRACT

A device for closing a pipe branch, especially for closing either orifice of a Y-shaped distributor connection, which is to close the inflow of the unoccupied flow-off in a gastight and watertight manner, is proposed. At the same time, there will be the possibility of mixing the medium for all the connections. To achieve this object, for this purpose either branching-off junction connection is made closeable by means of a common rotary plug, the rotary plug being designed as an oblique cylinder section (see the drawing for this).

18 Claims, 2 Drawing Sheets

DEVICE FOR CLOSING A PIPE BRANCH

BACKGROUND OF THE INVENTION

The invention relates to a device for closing a pipe branch, especially for closing either orifice of a Y-shaped distributor connection.

In the extraction of bulk material from silos, it is often necessary to convey the extracted bulk material alternatively to two or more locations separated in space. Conversely, it is possible to convey bulk material from two or more different silos to a common extraction point. At the same time, it is necessary to ensure that at no time gas or solids, and in special cases also liquid, are able to pass from the line carrying bulk material at that particular moment into the closed line. That is to say the line segments must be absolutely leakproof relative to one another.

The feed connection directed downwards or upwards in a Y-shaped manner can be closed in various ways. For example, slides, flaps, a common pivoting flap, ball valves, rotary plugs or the like can be mounted in both connections. The disadvantage of these devices is that there can form above the closing device dead zones in which bulk material accumulates under certain circumstances, this deposited material being released again when the closing device is opened. Furthermore, the connecting orifices can be sealed off only ineffectually.

German Utility Model 1,977,787 and German Patent Specification No. 277,519 disclose distributor devices, in which the Y-shaped distributor connections can be closed by means of a common rotary plug designed as a rotary cylinder of oblique cylinder section, the center axis of the rotary plug being aligned with the pipe axis of the inflow connection. With the known devices, although it is possible in a simple way to change over the respective junction connections to be put in communication, nevertheless devices of this type, in terms of their sealing, are sensitive to bulk materials since the sealing surfaces come to rest directly in the bulk-material stream. Insofar as the inflow connection is given the same inside throughflow diameter as the two junction connections, there are problems in the matching of the rotary plug, since the connecting orifices of the junction connections cannot be closed completely by the cylindrical surface of the rotary plug. Consequently, in the known devices, the junction connections are always designed with a smaller inside diameter. An alternative solution to this is shown in German Patent Specification 277,519. Here, the closing device is not designed as a simple rotary plug having an oblique cylinder section, but is made substantially more complicated.

SUMMARY OF THE INVENTION

An object of the invention is is to provide the simplest possible distributor connection of the relevant generic type, which closes the inflow of the unoccupied flow-off in a gastight and watertight manner at the least possible outlay in terms of control and with low actuating forces. At the same time, the diameter of the junction connections are made equal to the diameter of the inflow connection.

According to the invention this object is achieved by meams of a device for closing at least one outlet branch of a branched pipe having a vertical inlet pipe, a plurality of outlet branches and a lower housing depending from the outlet branches. The device comprises a rotary plug having a cylindrical wall for covering at least one outlet branch and an elliptically shaped and substantially flat oblique upper surface. An elliptical groove extends around the cylindrical wall in a plane approximately parallel to the oblique upper surface and an inflatable seal is continuously disposed in the groove. When inflated, the seal continuously engages the vertical pipe and the lower housing, thereby sealing a branch of the pipe covered by the cylindrical wall. The device further includes a means for inflating the seal.

In one embodiment the device according to the invention improves on the device of German Utility Model 1,977,787 in such a way that the object of the invention can be achieved in an outstanding way. Because the device according to the invention has a construction which is very simple in terms of its basic design, it becomes possible to achieve non-sensitive operation without faults. At the same time, high mechanical reliability ensures that the sealing off of an outflow or inflow connection is guaranteed under all circumstances.

To guarantee completely reliable sealing, the sealing means continuously extending around in a groove is designed as an inflatable sealing means with intermittent subjection to pressure being provided. Inflatable sealing means of this type are supplied as piece goods with relatively large tolerances. Furthermore, the Y-shaped distributor housings, especially when they have relatively large dimensions, are produced as cast workpieces which then have to undergo machining. To make it possible to work independently of production-related tolerances, the inflatable sealing means according to the invention can be used to compensate for virtually any tolerances. These tolerances which exist between the rotary plug and the distributor housing are then bridged by the inflatable sealing means. At the same time, a simple control of the exertion of pressure and the relief of pressure serves for operating the device without difficulty.

According to a feature of the invention, a mechanical switch element may be used to detect the respective end position of the rotary plug and the compressed air in the sealing means is controlled as a result. The consequence of this is that the operation of pivoting the rotary plug from one connecting orifice to the next connecting orifice can always be carried to with the sealing means pressureless and therefore very easily, without friction, and free of wear.

According to preferred embodiment of the invention, the switch element is designed with a tappet or a roller tappet prevented from rotating. The tappet engages respectively into positional bores in the end position of the rotary plug and allows the sealing means subsequently to be subjected to pressure. A three-way valve is preferably provided for this purpose. According to a further feature of the invention, the inflatable sealing means preferably has a rectangular cross-section which preferably possesses V-shaped indentations or ripples along its groove flanks. This inflatable sealing means is set into an appropriate groove, likewise of rectangular cross-section, in the rotary plug.

The elastic sealing means arranged parallel to the elliptic sectional plane is set reliably into the rotary plug as a result of its elongated shape, so that it cannot jump out even when it brushes over the connecting orifices.

Normally, the inside diameter of the inflow connection is made larger than the inside diameter of the two junction connections. If the inside diameters of the junction connections are made equal to the diameter of the inflow connection, the two intersection lines for the connecting orifices of the junction connections meet on the plane of symmetry of the inflow connection. There would, therefore, no longer be any supporting surface in this region for the sealing means on the rotary plug. Consequently, with junction connections having the same or virtually the same inside diameter as the diameter of the inflow connection, a lateral accumulation of material at the inflow orifices of the junction connections maybe effected as early as during the operation of casting the distribution housing. A supporting surface for the rotary-plug sealing means continuously extending around is thereby obtained, and preferably only this supporting region for the sealing means need undergo more exact cutting machining in the cast distributor housing.

Further features and advantages according to the invention are set out in the following description with reference to the exemplary embodiment illustrated in the figures.

DETAILED DESCRIPTION OF THE PREFERRED EMBODIMENTS

Figure 1:
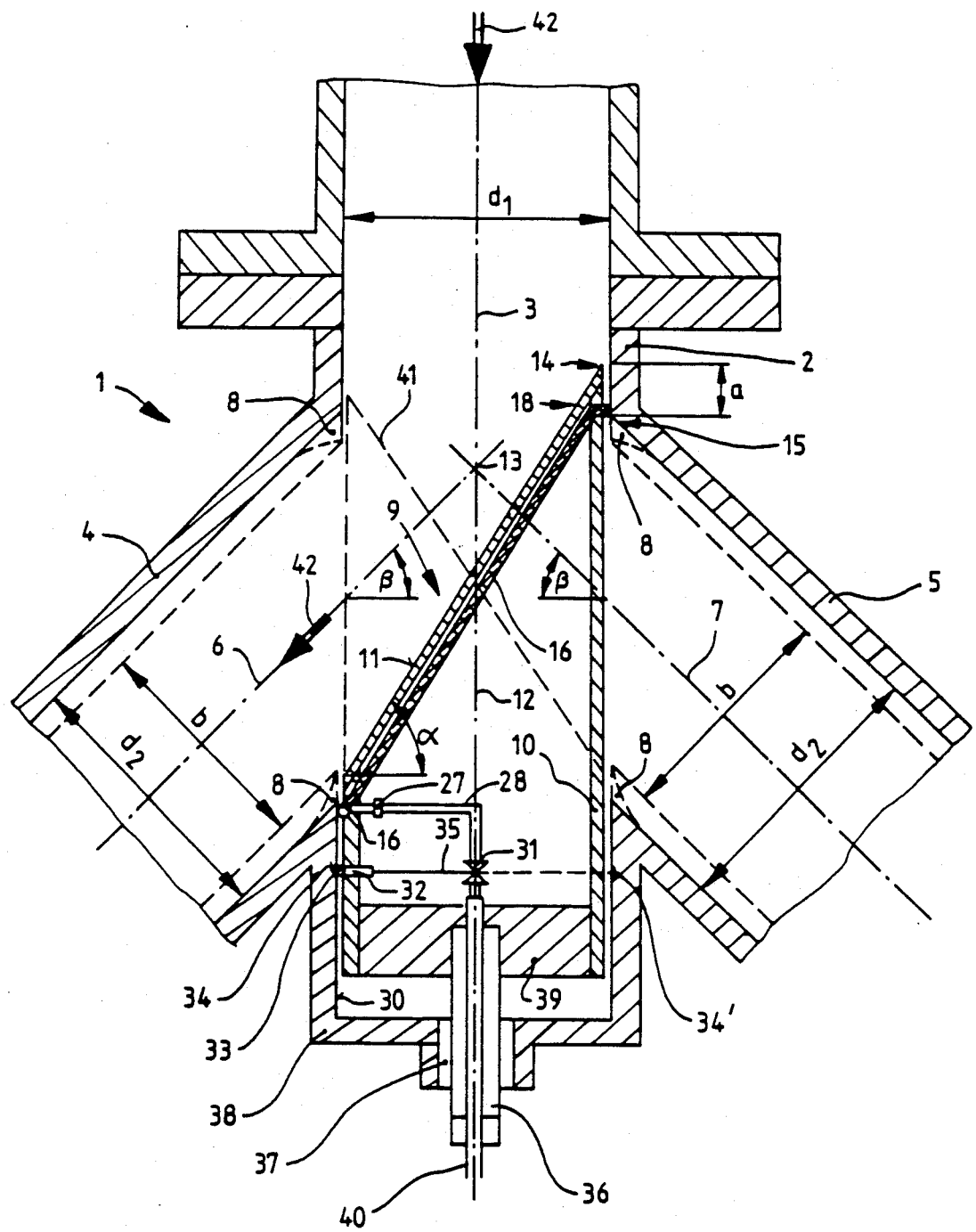
FIG. 1 shows a longitudinal section through the device according to the invention.

The distributor connection (1) shown in FIG. 1 is designed as a Y-shaped distributor connection and corresponds in terms of its basic design to the device according to German Utility Model 1,977,787. The distributor connection (1) has an upper inflow connection (2) with a vertical pipe axis (3) and two junction connections (4, 5) branching off at an angle to the axis (3) and having pipe axes (6, 7) extending at an acute angle relative to the vertical pipe axis (3).

The diameter of the distributor connection (2) forming the inflow is designated by $d_1$, and the diameters of the junction connections (4, 5) are designated by $d_2$. Since the intersection lines of the cut-out orifices for the junction connections (4, 5) opening into the inflow connection (2) should not intersect in the vertical plane of symmetry passing through the vertical pipe axis (3), the inside diameter $d_1$ of the inflow connection (2) must be somewhat larger than the orifice cross-section of the junction connections (4, 5) directed towards the inflow connection (2).

To make the inside diameter $d_2$ of the junction connections (4, 5) equal to the inside diameter $d_1$ of the inflow connection (2), each junction connection (4, 5), in its orifice region directed towards the inflow connection (2) of the distributor housing (1), is provided with a lateral accumulation of material (8) as early as during the casting operation, so that only an effective inner width of $b < d_1$ is obtained in this region. In FIG. 1, the accumulation of material (8) is represented by dot-and-dash lines, respectively offset 90°.

The device according to the invention has a rotary plug (9) which is in the form of a rotary cylinder having a cylinder wall (10), an oblique upper surface or cylinder-section surface (11). The cylindersection surface (11) is elliptical and is set obliquely at an angle $\alpha$ in the tubular cylinder of the inflow connection (2). The center axis (12) of the rotary plug (9) is aligned with the pipe axis (3) of the inflow connection (2).

When the two junction connections (4, 5) are arranged symmetrically, that is to say when the intersection point (13) of the pipe axes (6, 7) intersects with the pipe axes (3, 12), the angle of inclination $\alpha$ of the cylinder-section surface or terminating surface (11) of the rotary plug (9) must be larger than the angle $\beta$ of the pipe axes of the junction connections (4, 5) relative to the horizontal. The topmost point (14) of the terminating surface of the rotary plug (9) is consequently the amount "a" above the topmost point (15) of the connecting orifice of the junction connection (4, 5) to be closed.

Sealing between the rotary plug (9) and the cylindrical housing of the distributor connection (1) is obtained by an inflatable sealing means (16) which continuously extends elliptically around and which runs just below the oblique cylinder surface (11) of the rotary plug (9) and parallel to this. As shown in detail in FIGS. 1 and 2, the inflatable sealing means (16) continuously extending around is set non-positively and/or positively into a groove (17) made in the cylindrical surface (10) of the rotary plug (9). The topmost point (18) (FIG. 1) of the sealing means (16) must be higher than the topmost point (15) of the inlet orifice of the junction connection (5) to be closed. As a result of the accumulation of material (8) which is present in the lateral region of the entry orifices to the junction connections (4, 5) and which is offset 90° in relation to the way shown in FIG. 1, the sealing means (16) runs along this surface in this region. During the production of the distributor connection (1), it is sufficient to machine the effective supporting surface for the sealing means (16).

In the exemplary embodiment illustrated in FIG. 1, therefore, the junction connection (5) is closed by the lateral cylindrical surface (10) of the rotary plug (9), whilst the orifice of the junction connection (4) is opened completely by means of the elliptic terminating surface (11).

Figure 2:
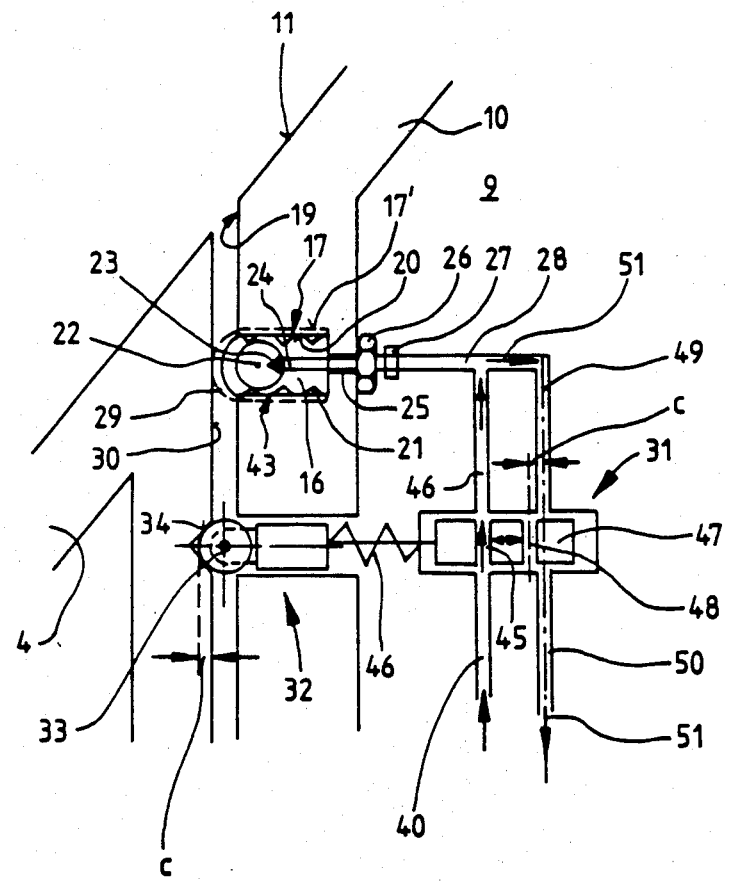
FIG. 2 shows an enlarged representation of the sealing means with a control unit of FIG. 1.

The rubber sealing means (16) continuously extending around, illustrated in FIGS. 1 and 2, has, for example, a rectangular cross-section and is set into the groove (17) of likewise rectangular cross-section. The lateral flanks (43) of the sealing-means groove (17) are perpendicular to the outer cylindrical surface (19) at any point on the rotary-plug circumference. If appropriate, the groove (17) can widen conically inwards as a result of a trapezoidal cross-section (17').

The outer flanks (20) of the sealing means (16) and/or the groove flanks (43) can have elevations, or ripples (21). Preferably, the groove flanks (20) are provided with V-shaped indentations (21) for the positive retention of the sealing means (16). If appropriate, the sealing means (16) is glued into the groove (17) in order to prevent the sealing means from being pulled out unintentionally.

According to the invention, the sealing means (16), as an inflatable elastic sealing means is provided with an inner cavity (22). Before the sealing means (16) is introduced into the sealing-means groove (17), a pressure supply nipple (24) is pushed through the sealing means from the rear side of the latter into the cavity (22). For this purpose, the nipple has a V-shaped tip (23), the wide rear side of which comes up against the cavity wall after the nipple has been pushed through into the cavity (22). The sealing means (16) is then pushed by means of the metal nipple (24) through the bore (25) in the wall (10) and fastened by means of a lock nut (26). The metal nipple (24), at its end, has a connecting flange (27) for an airline (28), in order to introduce compressed air into the interior (22) of the elastic sealing means (16). As a result of the exertion of pressure on the elastic sealing means (16), the front face (29) bulges against the inner wall (30) of the distributor connection and seals off the region continuously extending elliptically around and consequently the particular junction connection (4, 5) to be closed.

The sealing means (16) is subjected to pressure via a controllable three-way valve (31) inside the rotary plug (9). For this purpose, there is a switch element (32) with a mechanical tappet or a roller tappet (33) prevented from rotating, which engages into a recess (34) in the inner wall (30) of the distributor connection (1). The switch element (32) with the tappet (33) and the associated recess (34) is arranged on the rotary plug (9) or in the distributor connection (1) in such a way that the tappet (33) is in the recess (34) in the respective end position of the rotary plug (9), that is to say in the respective operating position. In FIG. 1, therefore, on the opposite side is a further recess (34'), into which the tappet (33) engages when the junction connection (4) is closed.

As soon as the tappet (33) has engaged in the recess (34) of the inner wall (30), the three-way valve (31) is stressed with the effect of supplying pressure to the sealing means (16) via the lines (40, 45, 46, 28), that is to say the elastic sealing means (16) is inflated, so that reliable sealing of the particular orifice of the junction connection (4, 5) to be closed takes place (see FIG. 2).

When the rotary plug (9) is to be brought into the other position, that is to say, in FIG. 1, into the position for sealing off the junction connection (4), the rotary plug must be rotated by means of the electrically or mechanically driveable rotary spindle (36) which is guided by means of a bush (37) through the lower housing part (38) of the distributor connection (1). For this, the rotary spindle (36) is fastened in a lower flange (39) of the rotary plug (9). The rotary spindle (36) can, for example, also serve at the same time as a duct for the compressed-air feed line (40) to the three-way valve (31).

When the rotary spindle (36) is rotated out of one end position shown in FIG. 1, the rotary plug (9) has to be rotated a small amount counter to the resistance of the spring-assisted (spring 46) tappet (33) in the recess (34) and counter to the resistance of the inflated elastic sealing means (16). As a result, the tappet (33), by sliding out of the recess (34), is pressed radially inwards by the amount "c", thus resulting in the actuation of the tappet (33) and consequently the actuation of the three-way valve (31) with the effect of relieving the sealing means (16) of pressure. At the same time, the control slide (47) closes the orifice (45) and opens the further pressure-relief orifice (48), so that the air can escape from the valve (16) into the open via the lines (28, 49, 48, 50) (arrow 51). Thereafter, without the sealing means (16) being subjected to pressure, the rotary plug (9) can be rotated easily and free of friction and wear in the distributor connection (1) up the desired end position for closing a further junction connection. In FIG. 1, this is the junction connection (4). As a result of the closing of the opposite junction connection (4), the mechanical tappet (33) engages into the opposite recess (34') in the inner wall (30). As a result, the mechanical tappet (33) and the control slide (47) run radially outwards by the amount "c" and open the valve (31) via the lines (40, 45, 46, 28) with the effect of subjecting the sealing means (16) to pressure. The exertion of pressure is consequently controlled completely automatically, without the need for the addition of an electrical signal to control the compressed air for the sealing means.

The opposite position of the rotary plug (9) is indicated by the reference symbol (41). The path of the flowing medium is represented by the arrows (42).

The invention is not restricted to the exemplary embodiment described and illustrated. On the contrary, it also embraces all developments and designs accessible to a person skilled in the art without any intrinsic inventive content.

What is claimed:

1. A device for closing a pipe branch, especially for closing either orifice of a Y-shaped distributor connection, with an upper inflow connection having a vertical pipe axis and at least two junction connections branching off at an angle to said vertical pipe axis and having pipe axes extending at an acute angle relative to the vertical pipe axis of the inflow connection, each said junction connection being closeable by means of a common rotary plug comprising a rotary cylinder having an oblique elliptical upper surface, a cylindrical surface connected to said upper surface, and a center axis which is aligned with the pipe axis of the inflow connection, an inflatable sealing means to seal off the entry orifice of the junction connection to be closed from the inflow connection, said inflatable sealing means continuously extending elliptically around and approximately parallel to the elliptic upper surface of the rotary plug and being disposed in a groove, said groove continuously extending around said cylindrical surface of the rotary plug, and wherein the sealing means is subjected to or relieved of pressure at a stationary end position via a valve control controlled by a control unit.

2. A device as claimed in claim 1, wherein said end position of the rotary plug can be detected by means of a control unit comprising a mechanical switch element, and the valve control comprises a three-way valve.

3. A device as claimed in claim 2, wherein the control unit has a tappet prevented from rotating, which, starting from the cylindrical surface of the rotary plug, is engageable into positional bores in the distributor housing, and the sealing means can be subjected to compressed air when the tappet is engaged.

4. The device of claim 3 wherein said tappet is a roller tappet.

5. A device as claimed in claim 1, wherein the inflatable sealing means is made rectangular in cross-section, the sealing-means groove having flanks perpendicular to the cylindrical surface of the rotary plug at each point on the rotary-plug circumference.

6. A device as claimed in claim 5, wherein the groove flanks of the elastic sealing means have V-shaped indentations.

7. A device as claimed in claim 1, wherein the junction connections have an inside diameter equal to the inside diameter of the inflow connection and the pipe transition region of the junction connections to the inflow connection have a lateral accumulation of material for narrowing the cross-section of the junction connections to a smaller passage width.

8. The device of claim 1 wherein said oblique upper surface of said rotary plug is substantially flat.

9. A device for closing at least one outlet branch of a branched pipe having a vertical inlet pipe, a plurality of outlet branches and a lower housing depending from said outlet branches, said device comprising a rotary plug having a cylindrical wall for covering at least one outlet branch, an elliptically shaped oblique upper surface, an elliptical groove extending around said cylindrical wall in a plane approximately parallel to the outer edge of said oblique upper surface, an inflatable sealing means continuously disposed in said groove, said sealing means when inflated being capable of continuously engaging the vertical pipe and the lower housing, thereby sealing a branch of the pipe covered by said cylindrical wall, and a means for inflating said sealing means.

10. The device of claim 9 wherein said rotary plug further comprises means for detecting when said cylindrical wall is covering a branch of the branched pipe.

11. The device of claim 10 wherein said detection means comprises a tappet connected to said rotary plug and a bore on the lower housing of the pipe which engages said tappet, thereby holding said rotary plug in a position covering a branch of the branched pipe; and a means for releasing said tappet from engagement with said bore.

12. The device of claim 10 wherein said detection means further comprises means for activating said inflation means when said cylindrical wall is in a position covering a branch of the pipe.

13. The device of claim 12 wherein said detection means further comprises a tappet connected to said rotary plug and a bore on the lower housing of the pipe which engages said tappet, thereby holding said rotary plug in a position covering a branch of the branched pipe; and a means for releasing said tappet from engagement with said bore.

14. The device of claim 13 wherein said means for activating said inflation means and said means for releasing said tappet comprises a three-way valve.

15. The device of claim 9 wherein said groove is rectangular in cross-section.

16. The device of claim 9 wherein said groove and said sealing means having substantially parallel flanks which are rippled so that a flank of said sealing means mates with a corresponding flank of said groove.

17. A valve device comprising:
a branched pipe having a vertical inlet pipe, a plurality of outlet branches having openings onto said inlet pipe, the axis each said outlet branch being at an acute angle to the axis of said inlet branch, and a lower housing depending from said outlet branches; and
a rotary plug for sealably closing one of said outlet branches, said rotary plug having a cylindrical wall for covering at least one said outlet branch, an elliptically shaped and substantially flat oblique upper surface, an elliptical groove extending around said cylindrical wall in a plane approximately parallel to said oblique upper surface, an inflatable sealing means continuously disposed in said groove, said sealing means when inflated being in continuous engagement with said vertical pipe and said lower housing, thereby sealing the branch of the pipe covered by said cylindrical wall, a means for inflating said sealing means.

18. The device of claim 17 wherein the angle of slant relative to the horizontal of the oblique upper surface of the plug is greater than the angle relative to horizontal of the axis of each said outlet branch.

* * * * *